United States Patent
Azemati et al.

(10) Patent No.: US 9,995,890 B2
(45) Date of Patent: Jun. 12, 2018

(54) THERMAL MANAGEMENT OF A LOCKER ETALON IN A TRANSMITTER OPTICAL SUBASSEMBLY

(75) Inventors: Saeid Azemati, Auburndale, MA (US); Farhang Sakhitab, Chestnut Hill, MA (US); Jamie Lars Silva, Sudbury, MA (US)

(73) Assignee: FINISAR CORPORATION, Sunnyvale, CA (US)

( * ) Notice: Subject to any disclaimer, the term of this patent is extended or adjusted under 35 U.S.C. 154(b) by 1537 days.

(21) Appl. No.: 13/246,779

(22) Filed: Sep. 27, 2011

(65) Prior Publication Data

US 2012/0076505 A1 Mar. 29, 2012

Related U.S. Application Data

(60) Provisional application No. 61/386,872, filed on Sep. 27, 2010.

(51) Int. Cl.
*H04B 10/12* (2006.01)
*G02B 6/42* (2006.01)

(52) U.S. Cl.
CPC ......... *G02B 6/4246* (2013.01); *G02B 6/4261* (2013.01); *G02B 6/4271* (2013.01)

(58) Field of Classification Search
CPC ....... H01L 23/38; H01L 35/32; H01L 35/325; H01S 5/02415; H01S 5/02288; H01S 5/02248; H01S 5/02446; G02B 6/4201; G02B 6/4246; G02B 6/4208; H05K 7/20418

See application file for complete search history.

(56) References Cited

U.S. PATENT DOCUMENTS

| | | | | |
|---|---|---|---|---|
| 6,556,752 B2 * | 4/2003 | Fang et al. | | 385/52 |
| 6,667,804 B1 * | 12/2003 | Kleinschmidt | | 356/326 |
| 6,724,791 B1 * | 4/2004 | Chiappetta et al. | | 372/36 |
| 2001/0033592 A1 * | 10/2001 | Yamauchi et al. | | 372/50 |
| 2003/0193983 A1 * | 10/2003 | Cheng et al. | | 372/92 |
| 2004/0004980 A1 * | 1/2004 | Mazed | | 372/32 |
| 2006/0086449 A1 * | 4/2006 | Nakayama | | 156/86 |
| 2008/0187325 A1 * | 8/2008 | McCallion et al. | | 398/192 |
| 2009/0122493 A1 * | 5/2009 | Hosking et al. | | 361/719 |

* cited by examiner

*Primary Examiner* — Ken N Vanderpuye
*Assistant Examiner* — David Lambert
(74) *Attorney, Agent, or Firm* — Maschoff Brennan

(57) ABSTRACT

Thermal management of a locker etalon in a transmitter optical subassembly (TOSA). In one example embodiment, a TOSA includes a case, a laser positioned within the case and electro-thermally connected to the case, a locker etalon positioned in the case and thermally connected to the case, and a thermoelectric cooler (TEC) positioned within the case and in thermal contact with both the laser and the locker etalon.

18 Claims, 8 Drawing Sheets

THERMAL MANAGEMENT OF A LOCKER ETALON IN A TRANSMITTER OPTICAL SUBASSEMBLY

CROSS REFERENCE TO A RELATED APPLICATION

This application claims priority to and the benefit of U.S. Provisional Patent Application Ser. No. 61/386,872, entitled THERMAL BRIDGE IN AN OPTICAL SUBASSEMBLY, filed on Sep. 27, 2010.

BACKGROUND

Optical subassemblies (OSAs) can generally be categorized as either transmitter OSAs (TOSAs) or receiver OSAs (ROSAs). A TOSA generally includes an optical transmitter, such as a laser, that is configured to convert electrical signals into corresponding optical signals. A ROSA generally includes an optical receiver, such as a photodiode, that is configured to convert optical signals into corresponding electrical signals.

The characteristics of a particular OSA can be dictated by an industry standard. For example, one characteristic that may be specified for a TOSA in various industry standards is the range of case temperatures over which the TOSA must be designed to function properly. Proper function can be achieved by regulating the temperature of internal components of the TOSA to remain constant despite changes in the case temperature. For example, a thermoelectric cooler (TEC) can be employed to maintain constant the temperature of internal components of a TOSA despite increases or decreases in the case temperature.

While TECs have generally proven effective in TOSAs, some challenges remain. For example, where a TOSA includes multiple internal components, a single TEC is sometimes ineffective at simultaneously regulating the temperatures of the multiple internal components. Failure to maintain constant the temperature of any one of the multiple internal components can result in the TOSA operating outside specified parameters.

Thus, there is a need for improved regulation of the temperatures of multiple internal components of a TOSA.

SUMMARY OF SOME EXAMPLE EMBODIMENTS

In general, example embodiments of the present invention relate to thermal management of a locker etalon in a transmitter optical subassembly (TOSA). Each of the locker etalons in each of the example TOSAs disclosed herein is thermally connected to a case of the TOSA. This thermal connection between the thermal etalon of a TOSA and the case of the TOSA can, in at least some example embodiments, effectively regulates the temperature of the locker etalon despite temperature fluctuation in the case temperature.

In one example embodiment, a TOSA includes a case, a laser positioned within the case and electro-thermally connected to the case, a locker etalon positioned in the case and thermally connected to the case, and a thermoelectric cooler (TEC) positioned within the case and in thermal contact with both the laser and the locker etalon.

In another example embodiment, an optoelectronic module includes a housing defining a transmit port, a printed circuit board at least partially positioned within the housing, and a TOSA positioned within the housing and electrically connected to the printed circuit board. The TOSA includes a case, a laser positioned within the case and electro-thermally connected to the case, an optical output port defined by the case and aligned with the transmit port so that optical signals generated by the laser can be transmitted outside the optoelectronic module through the optical output port and the transmit port, a locker etalon positioned in the case and thermally connected to the case, and a TEC positioned within the case and in thermal contact with both the laser and the locker etalon.

In yet another example embodiment, a method for thermal management of a locker etalon positioned within a case of a TOSA includes various acts. First, the locker etalon is thermally connected to the case via at least one or more wire bonds. Then, while operating the TOSA over a pre-defined range of case temperatures, the differences in temperature between the laser and the locker etalon is determined over the pre-defined range of case temperatures. Next, the differences in temperature between the laser and the locker etalon over the pre-defined range of case temperatures are determined to be not substantially constant. Finally, the number of wire bonds that are thermally connecting the locker etalon to the case is modified.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Moreover, it is to be understood that both the foregoing general description and the following detailed description of the present invention are exemplary and explanatory and are intended to provide further explanation of the invention as claimed.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments of the invention relate to thermal management of a locker etalon in a transmitter optical subassembly (TOSA). Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

1. Example Optoelectronic Module

Figure 1A:
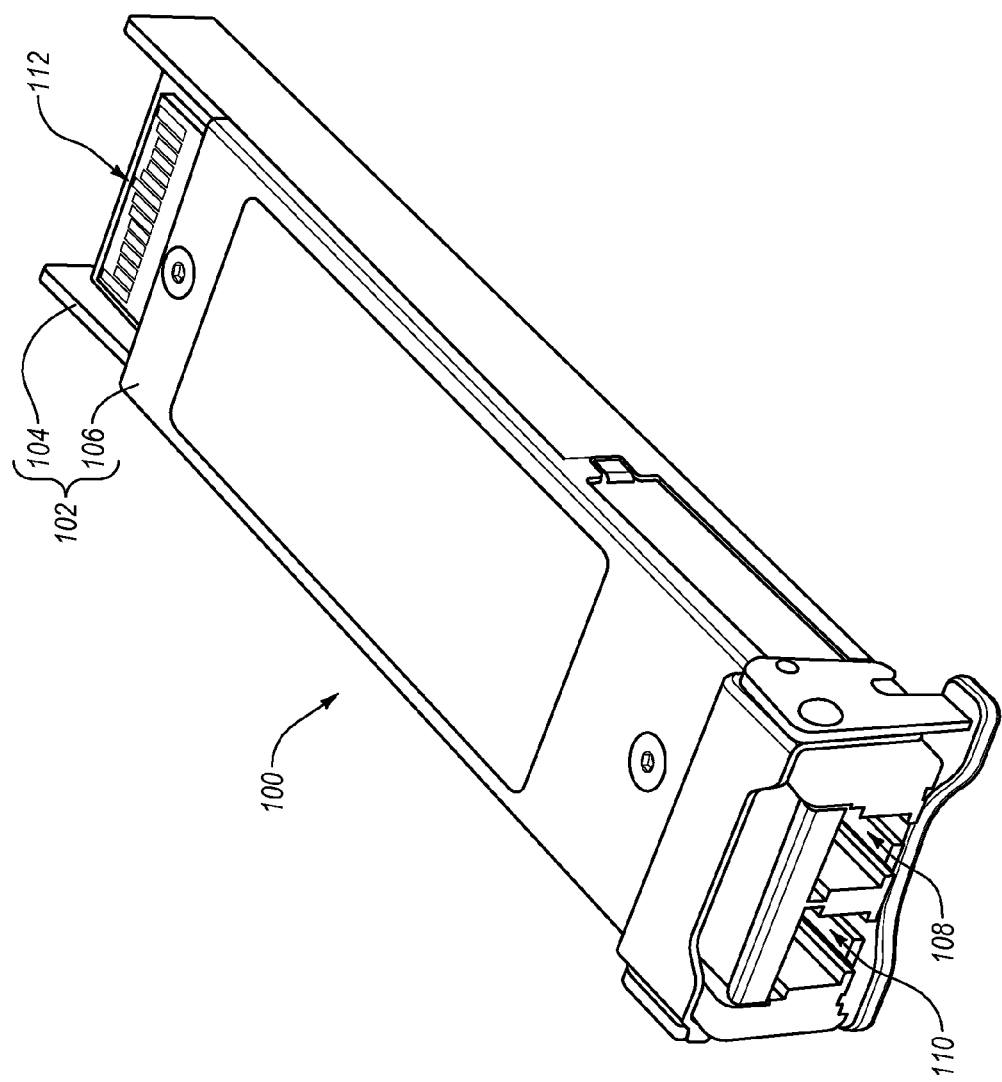
FIG. 1A is a bottom perspective view of an example optoelectronic module.
Figure 1B:
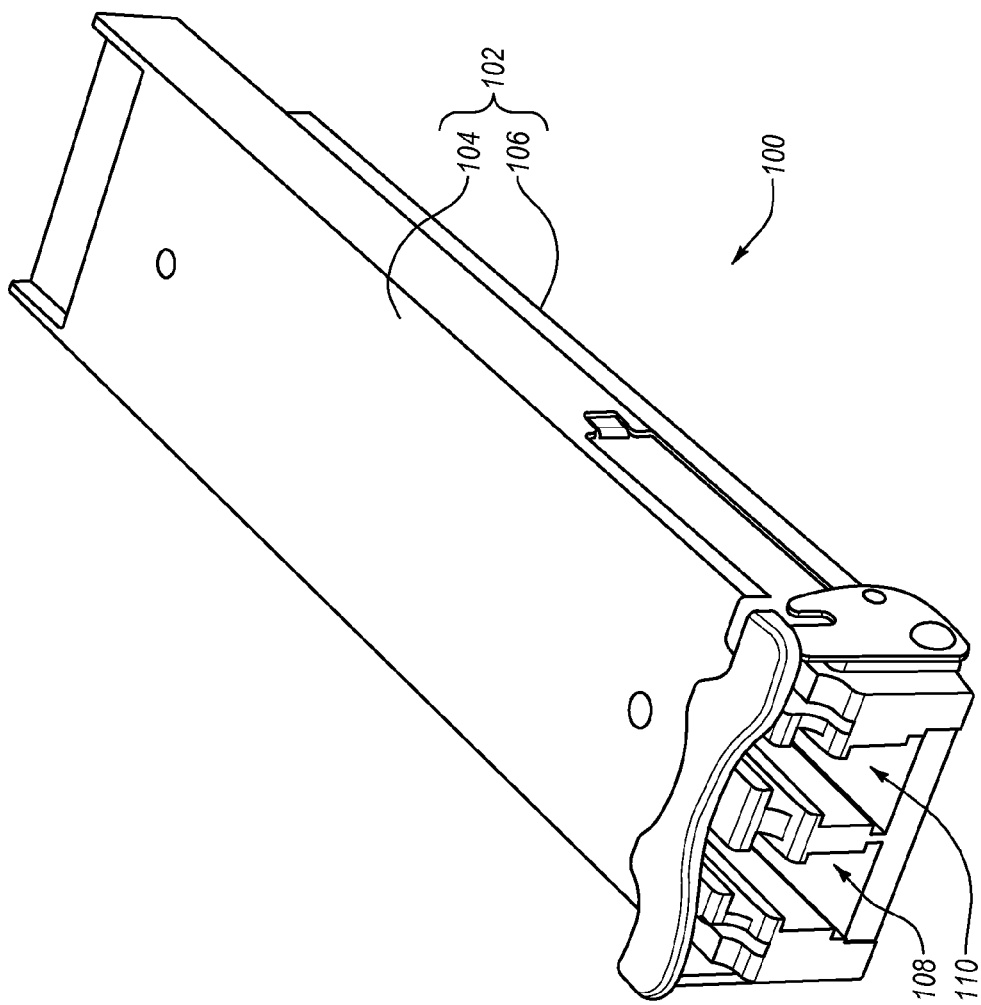
FIG. 1B is a bottom perspective view of the example optoelectronic module of FIG. 1A.

Reference is first made to FIGS. 1A and 1B which disclose aspects of an example optoelectronic module 100 for use in transmitting and receiving optical signals in connection with a host device (not shown). The module 100 is a Small Form Factor 10 Gb/s (XFP) transceiver that is substantially compliant with the XFP Multi-Source Agreement (MSA). As disclosed in FIG. 1, the module 100 includes various components, including a housing 102 made up of a top housing 104 and a bottom housing 106, a transmit port 108 and a receive port 110 defined in the bottom housing 106, and a printed circuit board (PCB) 112 including a variety of heat-generating components positioned within the housing 102.

The module 100 can be configured for optical signal transmission and reception at a variety of per-second data rates including, but not limited to, 1 Gbit, 2 Gbit, 2.5 Gbit, 4 Gbit, 8 Gbit, 10 Gbit, 10.7 Gbit, or higher. Furthermore, the module 100 can be configured for optical signal transmission and reception at one or more wavelengths including, but not limited to, 850 nm, 1310 nm, 1470 nm, 1490 nm, 1510 nm, 1530 nm, 1550 nm, 1570 nm, 1590 nm, or 1610 nm. Further, the module 100 can be configured to support various transmission standards including, but not limited to, Optical Fast Ethernet, Optical Gigabit Ethernet, 10 Gigabit Ethernet, 40G Ethernet, 100G Ethernet, 1×, 2×, 4×, 8×, 10×, and 16× Fibre Channel, SONET OC-3, OC-12, OC-48, OC-192, OC-768, 10 Gigabit Fibre Channel, 10 Gigabit Ethernet, 100BASE-T, and PON. Further, the module 100 is configured to operate properly with a case temperature range of −5° C. to 75° C. In addition, the module 100 can be configured to have a form factor that is substantially compliant with any of a variety of standards such as the SFP+ MSA, the SFF MSA, the SFP MSA, the CFP MSA, or the CXP MSA. It is noted that embodiments of the present invention may be particularly useful in modules that employ dense wave division multiplexing (DWDM), as the heat-generating components of these modules generate a relatively high amount of heat. One such component is the TOSA disclosed in FIG. 2A.

2. First Example TOSA

Figure 2A:
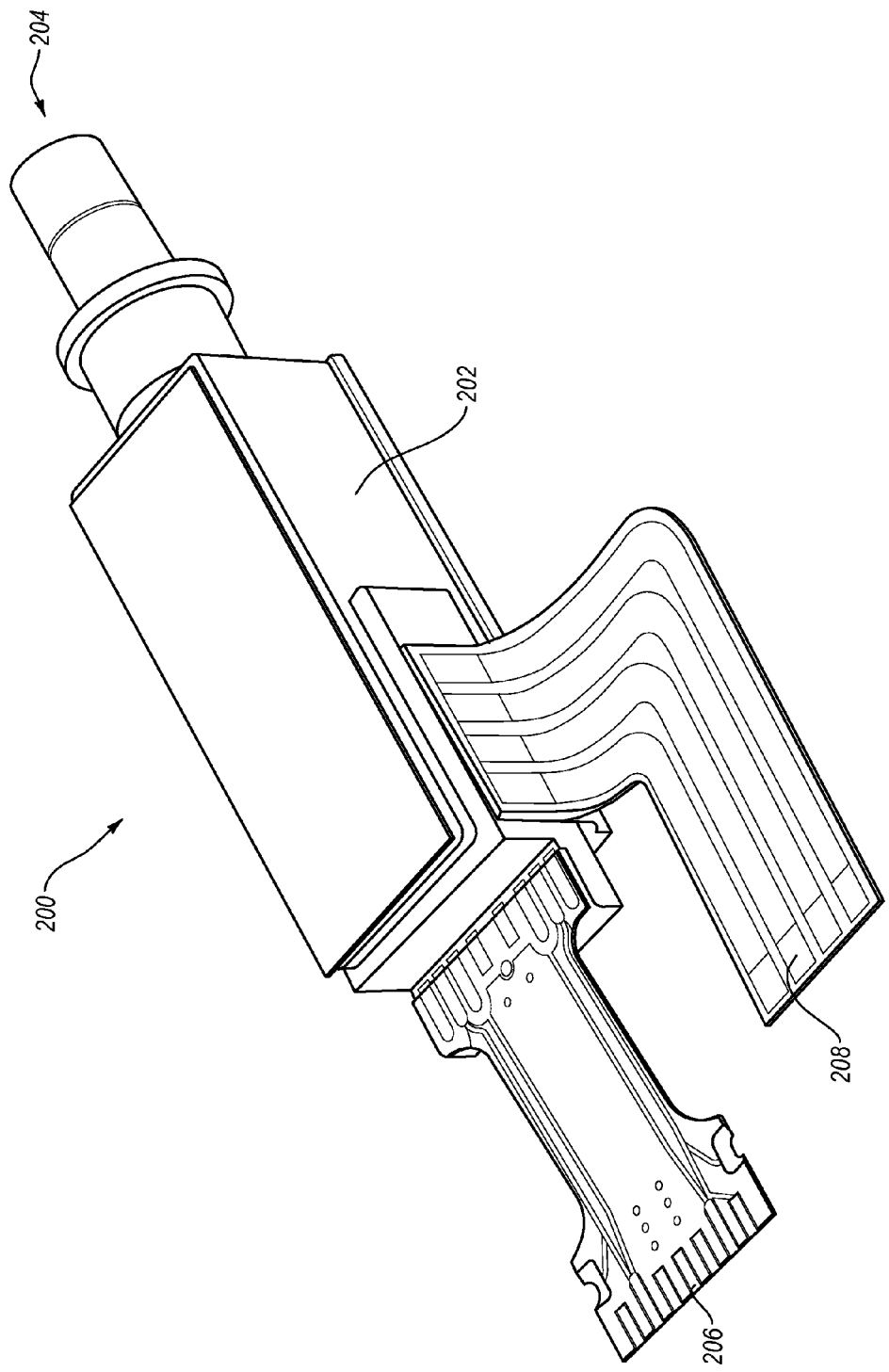
FIG. 2A is a perspective view of a first example transmitter optical subassembly (TOSA)
Figure 2B:
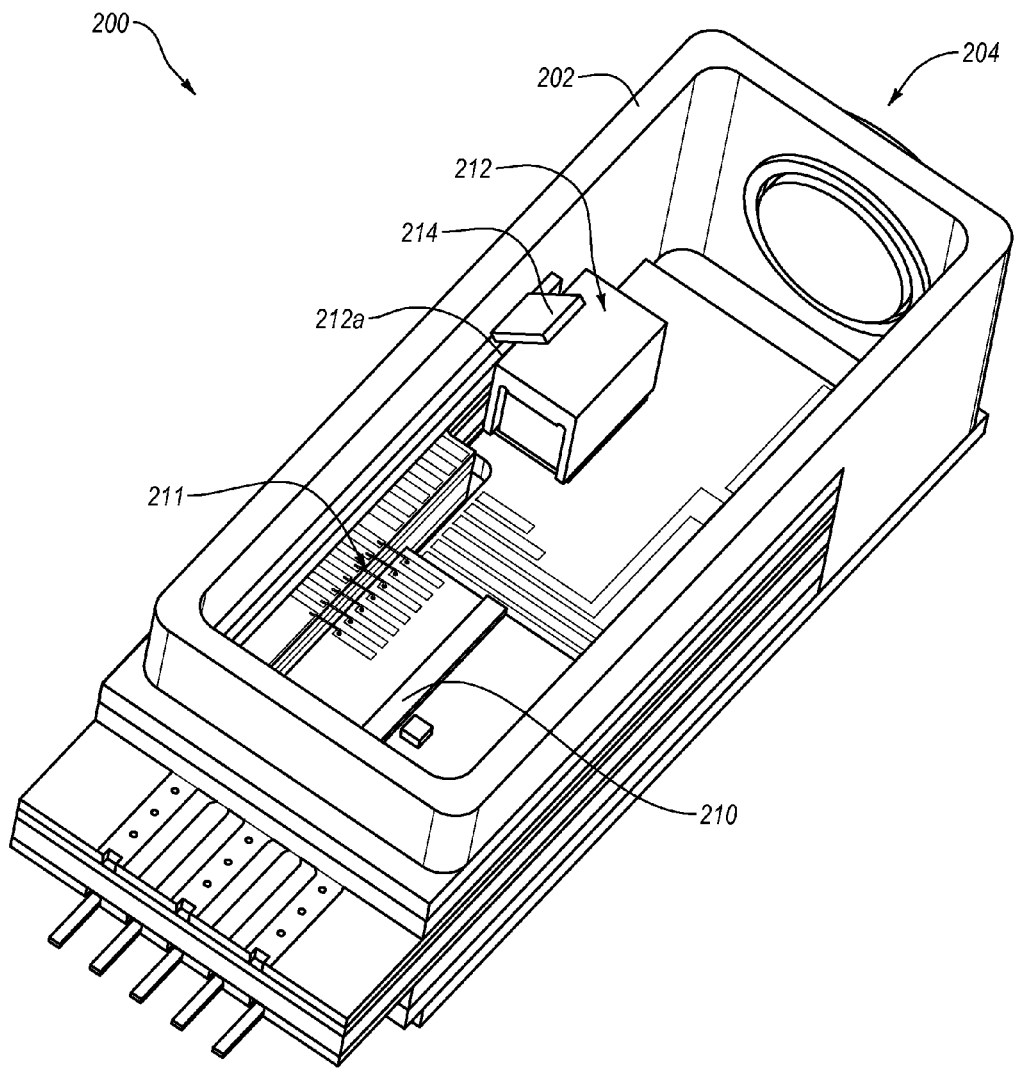
FIG. 2B is a perspective view of a portion of the first example TOSA of FIG. 2A.

With reference now to FIGS. 2A and 2B, an example TOSA 200 is disclosed. The example TOSA 200 can be integrated into an optoelectronic module, such as the module 100 disclosed in FIG. 1, for example. As disclosed in FIG. 2A, the example TOSA 200 includes a case 202, an optical output port 204, and first and second flex input cables 206 and 208. Once integrated into the module 100 of FIG. 1, the port 204 can be aligned with the transmit port 108 so that optical signals generated by the TOSA 200 can be transmitted outside the module 100 through the transmit port 108. Further, the cables 206 and 208 can be attached to the PCB 112 so that the operation of the TOSA 200 can be controlled by input signals received from the PCB 112.

Figure 6:
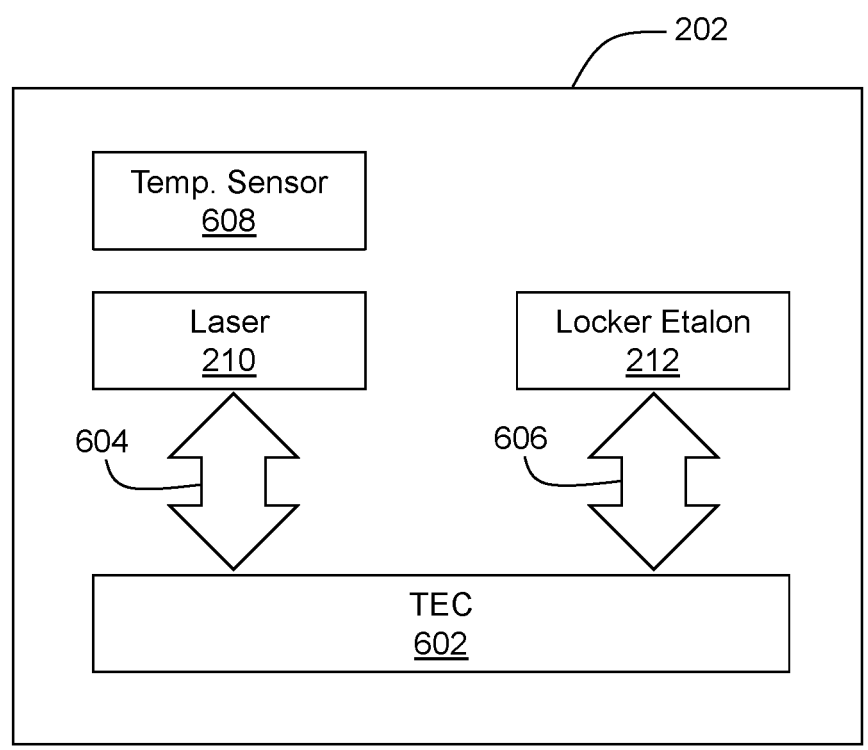
FIG. 6 is a block diagram of a portion of the first example TOSA of FIG. 6.

As disclosed in FIGS. 2B and 6, the TOSA 200 further includes a laser 210, wire bonds 211, a locker etalon 212, a thermoelectric cooler (TEC) 602 positioned underneath the laser 210 and the locker etalon 212 and in thermal contact with both the laser 210 and the locker etalon 212 as denoted by arrows 604 and 606 in FIG. 6, and a temperature sensor 608 located proximate the laser 210, all of which are positioned within the case 202. The temperature sensor 608 constantly monitors the temperature at its location and the amount of cooling provided by the TEC 602 is automatically adjusted in order to maintain constant the temperature of the laser 210 and the locker etalon 212. As the temperature sensor 608 is located proximate the laser 210, the temperature of the laser 210 is effectively maintained constant by the TEC 602.

Unfortunately, however, the distance between the temperature sensor 608 and the locker etalon 212 results in a disparity between the temperature at the temperature sensor 608 and the temperature of the locker etalon 212, which results in the TEC 602 alone not being effective at maintaining the temperature of the locker etalon 212 equal to the temperature of the laser 210. Further, the wire bonds 211 electro-thermally connect the laser 210 to the case 202, thus resulting in thermal leakage between the laser 210 and the case 202. In one example embodiment, under a case temperature range of −5° C. to 75° C., the single TEC 602 allows a temperature gradient of up to about 3° C. between the laser 210 and the locker etalon 212.

This temperature gradient between the laser 210 and the locker etalon 212 causes the peak etalon ITU frequency of the locker etalon 212 to reach as high as about 5 GHz over the case temperature range of −5° C. to 75° C. However, proper operation of the locker etalon 212 requires that the peak etalon ITU frequency of the locker etalon 212 be maintained at no more than about 2 GHz. Further, the temperature of the locker etalon 212 has a reverse relationship with the temperature of the case 202. As the temperature of the case 202 increases, the temperature of the locker etalon 212 decreases faster than the temperature of the laser 210, resulting in the temperature gradient mentioned above.

To reduce or prevent this temperature gradient between the laser 210 and the locker etalon 212, the example TOSA 200 also includes a thermal bridge 214 disclosed in FIG. 2B. The thermal bridge 214 thermally connects the case 202 to the locker etalon 212. The thermal bridge 214 capitalizes on the reverse relationship between the temperature of the case 202 and the temperature of the locker etalon 212 by allowing a portion of the heat from the case 202 to conduct to the locker etalon 212, or heat from the locker etalon 212 to conduct to the case 202. This automatic heating or cooling of the locker etalon 212 reduces or prevents the temperature gradient between the laser 210 and the locker etalon 212. In at least one example embodiment, this reduction in the temperature gradient results in the peak etalon ITU frequency of the locker etalon 212 to reach no more than about 1 GHz over the case temperature range of −5° C. to 75° C.

Various factors affect the amount of heat that conducts through the thermal bridge 214 between the case 202 and the locker etalon 212 including, for example, the materials from which the thermal bridge 214, case 202, and locker etalon 212 are formed. For example, in at least one example embodiment, a portion of the locker etalon 212 and the thermal bridge 214 are formed from aluminum nitride or other heat-conductive material, another portion of the etalon body 212 is formed from fused silica, and the case 202 is formed from Kovar. The amount of heat conducted through the thermal bridge 214 can be adjusted by changing the material from which the thermal bridge 214, the locker etalon 212, and the case 202 are formed.

Another factor affecting the amount of heat that conducts through the thermal bridge 214 is the manner in which the thermal bridge 214 is attached to the case 202 and the etalon locker 212. For example, as disclosed in FIG. 2B, only an edge 212a of the etalon 212 is attached to the thermal bridge 214. In general, the greater the surface area of the etalon 212 that is attached to the thermal bridge 214, the greater amount of heat will conduct to the etalon 212 through the thermal bridge 214. The thermal bridge 214 may be attached to the etalon 212 and the case 202 using epoxy or solder for example. The amount of heat conducted through the thermal bridge 214 can therefore be adjusted by changing the attachment between the thermal bridge and the etalon 212, and by changing the attachment between the case 202 and the thermal bridge 214.

The thermal bridge 214 effectively regulates the temperature of an internal component of the TOSA 200, namely a locker etalon 212, despite temperature fluctuation in the case temperature of the case 202. In particular, the thermal connection of the thermal bridge 214 between the case 202 and the locker etalon 212 is configured to maintain a substantially constant difference in temperature between the laser 210 and the locker etalon 212 over the pre-defined range of case temperatures of −5° C. to 75° C. In particular, this effective regulation of the temperature of the locker etalon 212 results in the peak etalon ITU frequency of the locker etalon 212 remaining well within the 2 GHz threshold over the case temperature range of −5° C. to 75° C. This effective regulation of the temperature of the locker etalon 212 is accomplished without the need for a second TEC. Finally, although the thermal bridge 214 may cause the TEC 602 to consume additional power due to thermal leakage, this additional power consumption is more than offset by the improvement in peak etalon ITU frequency.

3. Second Example TOSA

Figure 3:
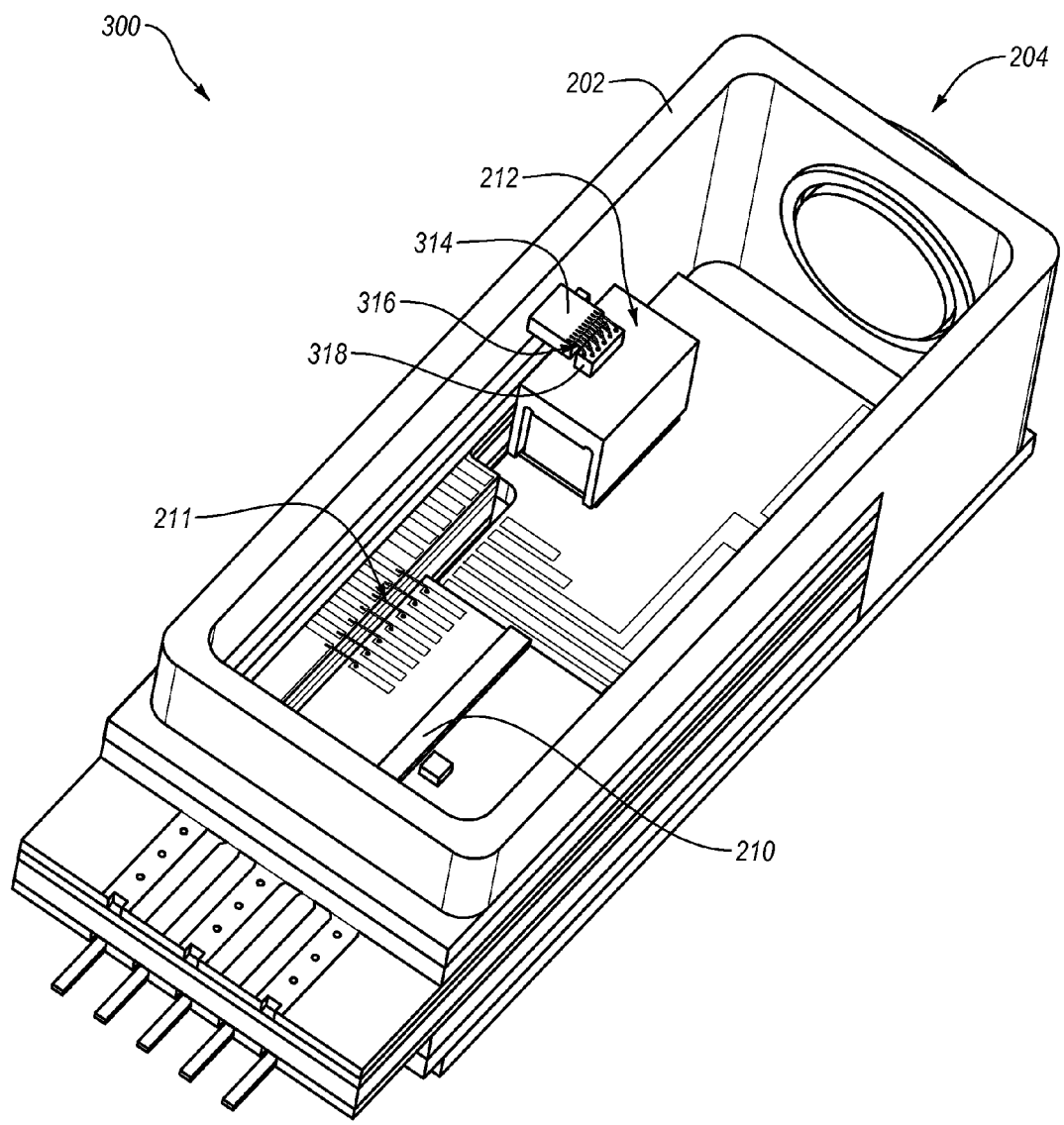
FIG. 3 is a perspective view of a portion of a second example TOSA.

With reference now to FIG. 3, a second example TOSA 300 is disclosed. The second example TOSA 300 is identical in many respects to the first example TOSA 200. Therefore, only those portions of the TOSA 300 that differ from the TOSA 200 will be discussed herein.

Instead of the thermal bridge 214 being directly attached to the case 202 to the locker etalon 212 in the TOSA 200, the example TOSA 300 includes a thermal bridge 314 that is directly attached to the case 202 but only indirectly attached to the locker etalon 212 via wire bonds 316 and a shim 318. It is noted that unlike typical wire bonds, such as the wire bonds 211, the wire bonds 316 are configured for thermal connection only and are not configured for use in transferring electrical data signals.

To reduce or prevent the temperature gradient discussed above between the laser 210 and the locker etalon 212, the thermal bridge 314, wire bonds 316, and shim 318 thermally connect the case 202 to the locker etalon 212 in the TOSA 300. The thermal bridge 314, wire bonds 316, and shim 318 thus function similarly to the thermal bridge 214 of the TOSA 200. Further, the thermal connection between the case 202 and the locker etalon 212 in the TOSA 300 can be easily adjusted and tuned during assembly of the TOSA 300 by simply modifying the number of wire bonds 316.

In particular, during assembly of the TOSA 300, one or more wire bonds 316 can be initially attached between the thermal bridge 314 and the shim 318 to thermally connect the locker etalon 212 to the case 202. Then, while operating the TOSA 300 over a pre-defined range of case temperatures, such as −5° C. to 75° C., the difference in temperature between the laser 210 and the locker etalon 212 over the pre-defined range of case temperatures can be determined. If it is determined that the difference in temperature between the laser 210 and the locker etalon 212 over the pre-defined range of case temperatures is not substantially constant, the number of wire bonds 316 that are thermally connecting the locker etalon 212 to the case 210 can be modified. For example, if it is desired that a greater amount of heat conducts through the wire bonds 316, additional wire bonds 316 can be added. Alternatively, if it is desired that a lesser amount of heat conducts through the wire bonds 316, one or more wire bonds 316 can be removed.

The amount of heat conducted through the thermal bridge 314, wire bonds 316, and shim 318 can be adjusted by changing the material from which the thermal bridge 314, the locker etalon 212, and the case 202 are formed. Another factor affecting the amount of heat that conducts through the thermal bridge 214 is the manner in which the thermal bridge 314 is attached to the case 202 and the shim 318 is attached to the etalon locker 212. For example, the thermal bridge 314 and the shim 318 may be attached to the case 202 and the etalon 212, respectively, using epoxy or solder for example.

The thermal bridge 314, wire bonds 316, and shim 318 effectively regulate the temperature of the locker etalon 212, despite temperature fluctuation in the case temperature of the case 202. In particular, the thermal connection of the thermal bridge 314, wire bonds 316, and shim 318 between the case 202 and the locker etalon 212 is configured to maintain a substantially constant difference in temperature between the laser 210 and the locker etalon 212 in the TOSA 300 over the pre-defined range of case temperatures. This effective regulation of the temperature of the locker etalon 212 is accomplished without the need for a second TEC in the TOSA 300.

4. Third Example TOSA

Figure 4:
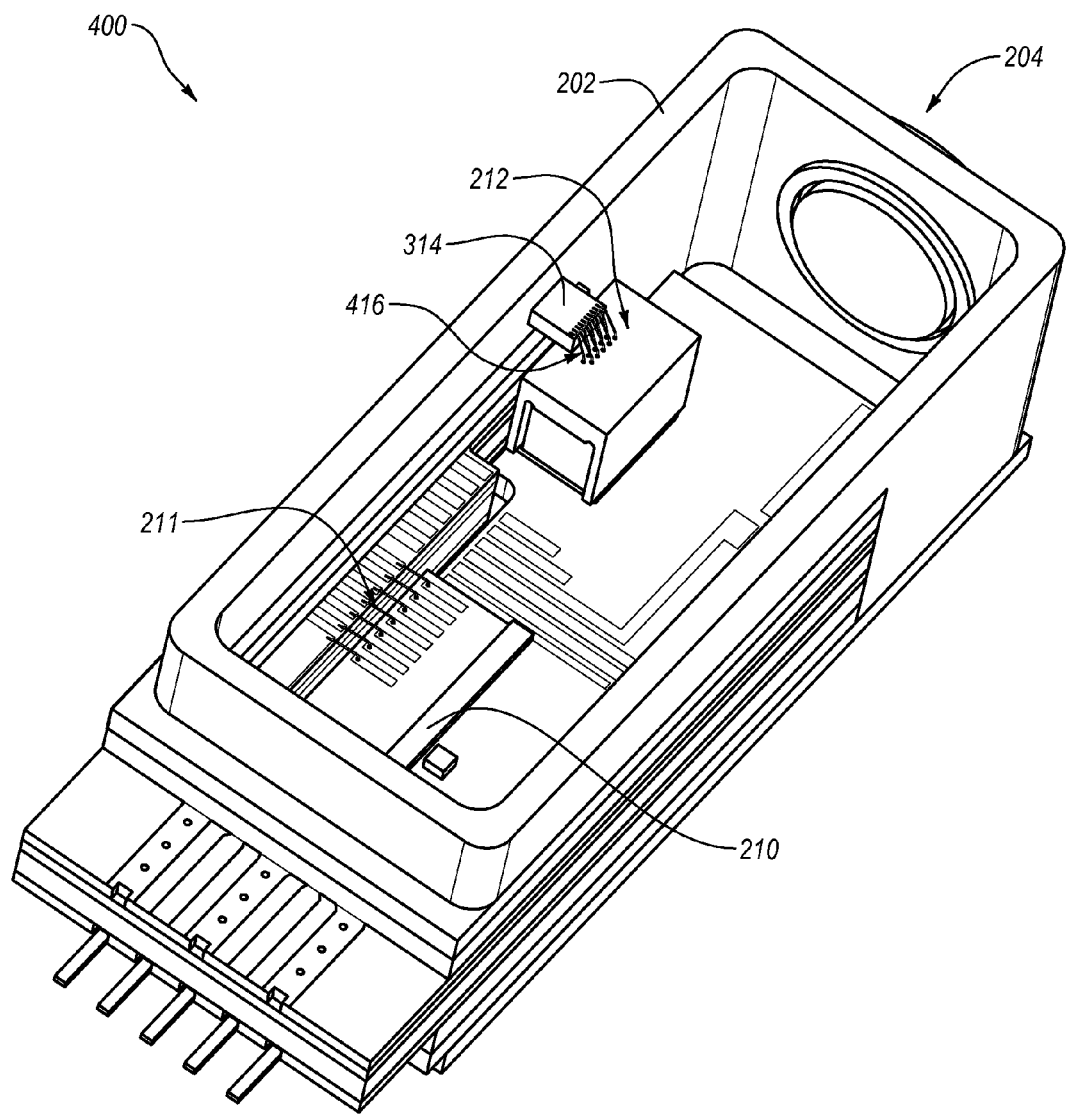
FIG. 4 is a perspective view of a portion of a third example TOSA.

With reference now to FIG. 4, a third example TOSA 400 is disclosed. The third example TOSA 400 is identical in many respects to the second example TOSA 300. Therefore, only those portions of the TOSA 400 that differ from the TOSA 300 will be discussed herein.

Instead of the wire bonds 316 and the shim 318 of the TOSA 300, the example TOSA 400 includes only wire bonds 416. It is noted that the wire bonds 416 are configured for thermal connection only and are not configured for use in transferring electrical data signals.

To reduce or prevent the temperature gradient discussed above between the laser 210 and the locker etalon 212, the thermal bridge 314 and wire bonds 416 of the TOSA 400 thermally connect the case 202 to the locker etalon 212. The thermal bridge 314 and wire bonds 316 of the TOSA 400 thus function similarly to the thermal bridge 214 of the TOSA 200 and the thermal bridge 314, wire bonds 316, and shim 318 of the TOSA 300. Further, the thermal connection between the case 202 and the locker etalon 212 in the TOSA 400 can be easily adjusted and tuned during assembly of the TOSA 400 by simply adjusting the number of wire bonds 416, as discussed above in connection with the TOSA 300.

The thermal bridge 314 and wire bonds 416 effectively regulate the temperature of the locker etalon 212, despite temperature fluctuation in the case temperature of the case 202. In particular, the thermal connection of the thermal bridge 314 and wire bonds 416 between the case 202 and the locker etalon 212 is configured to maintain a substantially constant difference in temperature between the laser 210 and the locker etalon 212 in the TOSA 400 over the pre-defined range of case temperatures. This effective regulation of the temperature of the locker etalon 212 is accomplished without the need for a second TEC in the TOSA 400.

5. Fourth Example TOSA

Figure 5:
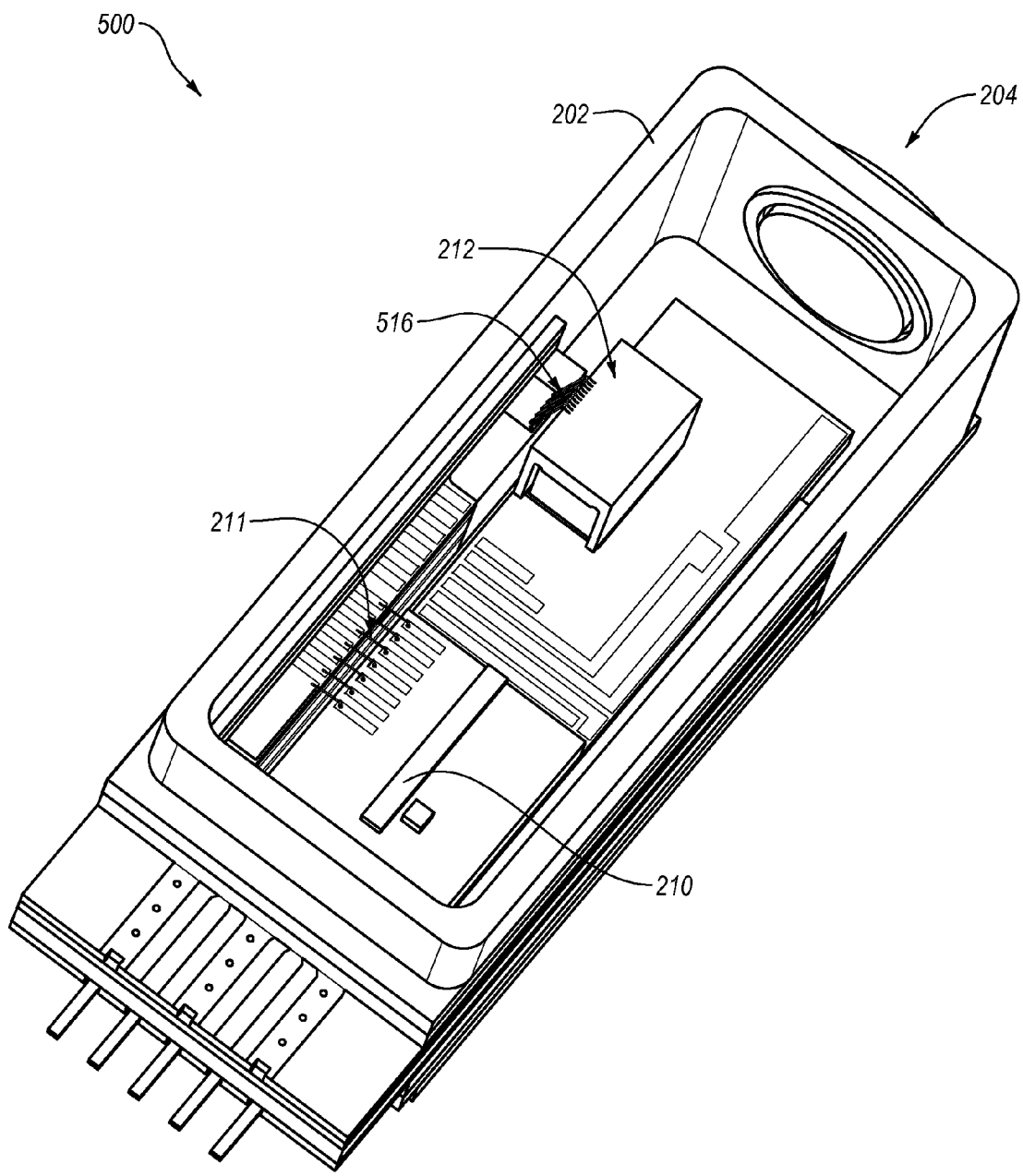
FIG. 5 is a perspective view of a portion of a fourth example TOSA.

With reference now to FIG. 5, a fourth example TOSA 500 is disclosed. The fourth example TOSA 500 is identical in many respects to the third example TOSA 400. Therefore, only those portions of the TOSA 500 that differ from the TOSA 400 will be discussed herein.

Instead of the thermal bridge 314 and the wire bonds 416 of the TOSA 400, the example TOSA 500 includes only wire bonds 516. It is noted that the wire bonds 516 are configured for thermal connection only and are not configured for use in transferring electrical data signals.

To reduce or prevent the temperature gradient discussed above between the laser 210 and the locker etalon 212, the wire bonds 516 of the TOSA 500 thermally connect the case 202 to the locker etalon 212 by being directly attached to the case 202 to the locker etalon 212 in the TOSA 500. The wire bonds 516 of the TOSA 500 thus function similarly to the thermal bridge 214 of the TOSA 200, the thermal bridge 314, wire bonds 316, and shim 318 of the TOSA 300, and the thermal bridge 314 and the wire bonds 416 of the TOSA 400. Further, the thermal connection between the case 202 and the locker etalon 212 in the TOSA 500 can be easily adjusted and tuned during assembly of the TOSA 500 by simply adjusting the number of wire bonds 516, as discussed above in connection with the TOSA 300.

The wire bonds 516 effectively regulate the temperature of the locker etalon 212, despite temperature fluctuation in the case temperature of the case 202. In particular, the thermal connection of the wire bonds 516 between the case 202 and the locker etalon 212 is configured to maintain a substantially constant difference in temperature between the laser 210 and the locker etalon 212 in the TOSA 500 over the pre-defined range of case temperatures. This effective regulation of the temperature of the locker etalon 212 is accomplished without the need for a second TEC in the TOSA 500.

The example embodiments disclosed herein may be embodied in other specific forms. The example embodiments disclosed herein are to be considered in all respects only as illustrative and not restrictive.

What is claimed is:

1. A transmitter optical subassembly (TOSA) comprising:
   a case;
   a laser positioned within the case and electro-thermally connected to the case;
   a locker etalon positioned in the case and thermally connected to the case; and
   a single thermoelectric cooler (TEC) positioned within the case and in thermal contact with both the laser and the locker etalon,
   wherein:
      the thermal connection between the case and the locker etalon is configured to maintain a substantially constant difference in temperature between the laser and the locker etalon over a pre-defined range of case temperatures of −5° C. to 75° C.; and
      a peak etalon ITU frequency of the locker etalon is less than or equal to 1 gigahertz (GHz) over the pre-defined range of case temperatures.

2. The TOSA as recited in claim 1, further comprising a temperature sensor positioned within the case closer to the laser than to the locker etalon.

3. The TOSA as recited in claim 1, wherein the locker etalon is thermally connected to the case via at least a thermal bridge that is thermally connected to both the case and the locker etalon.

4. The TOSA as recited in claim 3, wherein the thermal bridge is thermally connected to the case and the locker etalon via at least epoxy.

5. The TOSA as recited in claim 3, wherein the thermal bridge is thermally connected to the case and the locker etalon via at least solder.

6. The TOSA as recited in claim 3, wherein the thermal bridge is thermally connected to the locker etalon via at least one or more wire bonds.

7. The TOSA as recited in claim 6, wherein the wire bonds are configured for thermal connection only and are not configured for use in transferring electrical data signals.

8. The TOSA as recited in claim 1, wherein the locker etalon is thermally connected to the case via at least one or more wire bonds.

9. An optoelectronic module comprising:
   a housing defining a transmit port;
   a printed circuit board at least partially positioned within the housing; and
   a transmitter optical subassembly (TOSA) positioned within the housing and electrically connected to the printed circuit board, the TOSA comprising:
      a case;
      a laser positioned within the case and electro-thermally connected to the case;
      an optical output port defined by the case and aligned with the transmit port so that optical signals generated by the laser can be transmitted outside the optoelectronic module through the optical output port and the transmit port;
      a locker etalon positioned in the case and thermally connected to the case; and
      a single thermoelectric cooler (TEC) positioned within the case and in thermal contact with both the laser and the locker etalon,
   wherein:
      the thermal connection between the case and the locker etalon is configured to maintain a substantially constant difference in temperature between the laser and the locker etalon over a pre-defined range of case temperatures of −5° C. to 75° C.; and
      a peak etalon ITU frequency of the locker etalon is less than or equal to 1 gigahertz (GHz) over the pre-defined range of case temperatures.

10. The optoelectronic module as recited in claim 9, wherein the optoelectronic module is substantially compliant with the XFP Multi-Source Agreement (MSA).

11. The optoelectronic module as recited in claim 9, wherein the locker etalon is thermally connected to the case via at least a thermal bridge that is thermally connected to both the case and the locker etalon.

12. The optoelectronic module as recited in claim 11, wherein the thermal bridge is thermally connected to the case and the locker etalon via at least epoxy.

13. The optoelectronic module as recited in claim 11, wherein the thermal bridge is thermally connected to the case and the locker etalon via at least solder.

14. The optoelectronic module as recited in claim 11, wherein the thermal bridge is thermally connected to the locker etalon via at least one or more wire bonds.

15. The optoelectronic module as recited in claim 14, wherein the wire bonds are configured for thermal connection only and are not configured for use in transferring electrical data signals.

16. The optoelectronic module as recited in claim 9, wherein the locker etalon is thermally connected to the case via at least one or more wire bonds.

17. A method for thermal management of a locker etalon positioned within a case of a transmitter optical subassembly (TOSA), the method comprising the following acts:
   in the TOSA that includes the locker etalon and a laser both in thermal contact with a single thermoelectric cooler (TEC) positioned within the case, thermally connecting the locker etalon to the case via at least one or more wire bonds;

while operating the TOSA over a pre-defined range of case temperatures, determining the differences in temperature between the laser and the locker etalon over the pre-defined range of case temperatures;

determining that the differences in temperature between the laser and the locker etalon over the pre-defined range of case temperatures are not substantially constant; and modifying the number of wire bonds that are thermally connecting the locker etalon to the case so that in operation, a peak etalon ITU frequency of the locker etalon is less than or equal to 1 gigahertz (GHz) over the pre-defined range of case temperatures.

18. The method as recited in claim 17, wherein the wire bonds are configured for thermal connection only and are not configured for use in transferring electrical data signals.

* * * * *